United States Patent
Hatakeyama et al.

(10) Patent No.: US 10,611,308 B2
(45) Date of Patent: Apr. 7, 2020

(54) IMAGE GENERATION DEVICE AND IMAGE GENERATION METHOD

(71) Applicants: DENSO TEN LIMITED, Kobe-shi, Hyogo (JP); TOYOTA JIDOSHA KABUSHIKI KAISHA, Toyota-shi, Aichi-ken (JP)

(72) Inventors: Yukiko Hatakeyama, Kobe (JP); Kouei Kiyo, Kobe (JP); Tamaki Takeuchi, Kobe (JP); Rie Habuta, Kobe (JP); Akinari Motohiro, Kobe (JP); Tomoyuki Sato, Kobe (JP); Kohei Maejima, Nisshin (JP); Atsutoshi Sakaguchi, Toyota (JP); Masahiro Takahashi, Toyota (JP)

(73) Assignees: DENSO TEN LIMITED, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/834,705

(22) Filed: Dec. 7, 2017

(65) Prior Publication Data
US 2018/0178724 A1    Jun. 28, 2018

(30) Foreign Application Priority Data
Dec. 28, 2016    (JP) .................................. 2016-255247

(51) Int. Cl.
*B60R 1/00*     (2006.01)
*H04N 5/232*    (2006.01)
(Continued)

(52) U.S. Cl.
CPC ................ *B60R 1/002* (2013.01); *B60R 1/00* (2013.01); *G06K 9/209* (2013.01);
(Continued)

(58) Field of Classification Search
CPC ..... B60R 1/002; B60R 1/00; B60R 2300/303; B60R 2300/607; B60R 2300/802;
(Continued)

(56) References Cited

U.S. PATENT DOCUMENTS 9,479,740 B2 * 10/2016  Moriyama ............. G08G 1/165
2004/0220724 A1 * 11/2004  Hahn ..................... B60Q 9/005
                                                      701/301
(Continued)

FOREIGN PATENT DOCUMENTS

CN      102795161 A     11/2012
JP      2002-079881 A    3/2002
(Continued)

*Primary Examiner* — John R Schnurr
(74) *Attorney, Agent, or Firm* — Oliff PLC

(57) ABSTRACT

An image generation device according to an embodiment includes a synthesis unit and a superimposition unit. The synthesis unit synthesizes an overview image for a virtual viewpoint that is provided in a manner to look in a direction of travel of a vehicle so as to include at least a portion of a side of the vehicle based on a taken image that is taken by an image-taking unit that is provided on the vehicle. The superimposition unit superimposes a plane image where a vehicle has been caused to be planar, at a position of the vehicle on a road surface, on an overview image that is synthesized by the synthesis unit.

8 Claims, 8 Drawing Sheets

(51) Int. Cl.
  *G06K 9/20* (2006.01)
  *H04N 5/265* (2006.01)
  *G06K 9/00* (2006.01)
  *H04N 5/247* (2006.01)
(52) U.S. Cl.
  CPC ......... *H04N 5/23293* (2013.01); *H04N 5/265* (2013.01); *B60R 2300/303* (2013.01); *B60R 2300/607* (2013.01); *B60R 2300/802* (2013.01); *G06K 9/00805* (2013.01); *H04N 5/247* (2013.01)
(58) Field of Classification Search
  CPC ............... G06K 9/209; G06K 9/00805; H04N 5/23293; H04N 5/265; H04N 5/247
  See application file for complete search history.

(56) References Cited

U.S. PATENT DOCUMENTS

| | | | | |
|---|---|---|---|---|
| 2010/0201810 | A1* | 8/2010 | Shimazaki | B60R 1/00 348/135 |
| 2010/0259372 | A1* | 10/2010 | Hideshiro | G06T 3/4038 340/435 |
| 2012/0069187 | A1* | 3/2012 | Ozaki | B60R 1/00 348/148 |
| 2012/0113261 | A1* | 5/2012 | Satoh | B60R 1/00 348/148 |
| 2012/0249794 | A1* | 10/2012 | Kiyo | B60R 1/00 348/148 |
| 2012/0300075 | A1* | 11/2012 | Yamamoto | B60R 1/00 348/148 |
| 2014/0292805 | A1* | 10/2014 | Yamada | G09G 5/377 345/629 |
| 2018/0281681 | A1* | 10/2018 | Sunohara | G06T 1/0007 |
| 2019/0009720 | A1* | 1/2019 | Omiya | H04N 5/265 |

FOREIGN PATENT DOCUMENTS

| | | |
|---|---|---|
| JP | 2007-158426 A | 6/2007 |
| JP | 2007-274377 A | 10/2007 |
| JP | 2010-109684 A | 5/2010 |
| JP | 2010-183234 A | 8/2010 |
| JP | 2012-188057 A | 10/2012 |
| JP | 2016-192772 A | 11/2016 |
| WO | 2009/144994 A1 | 12/2009 |

* cited by examiner

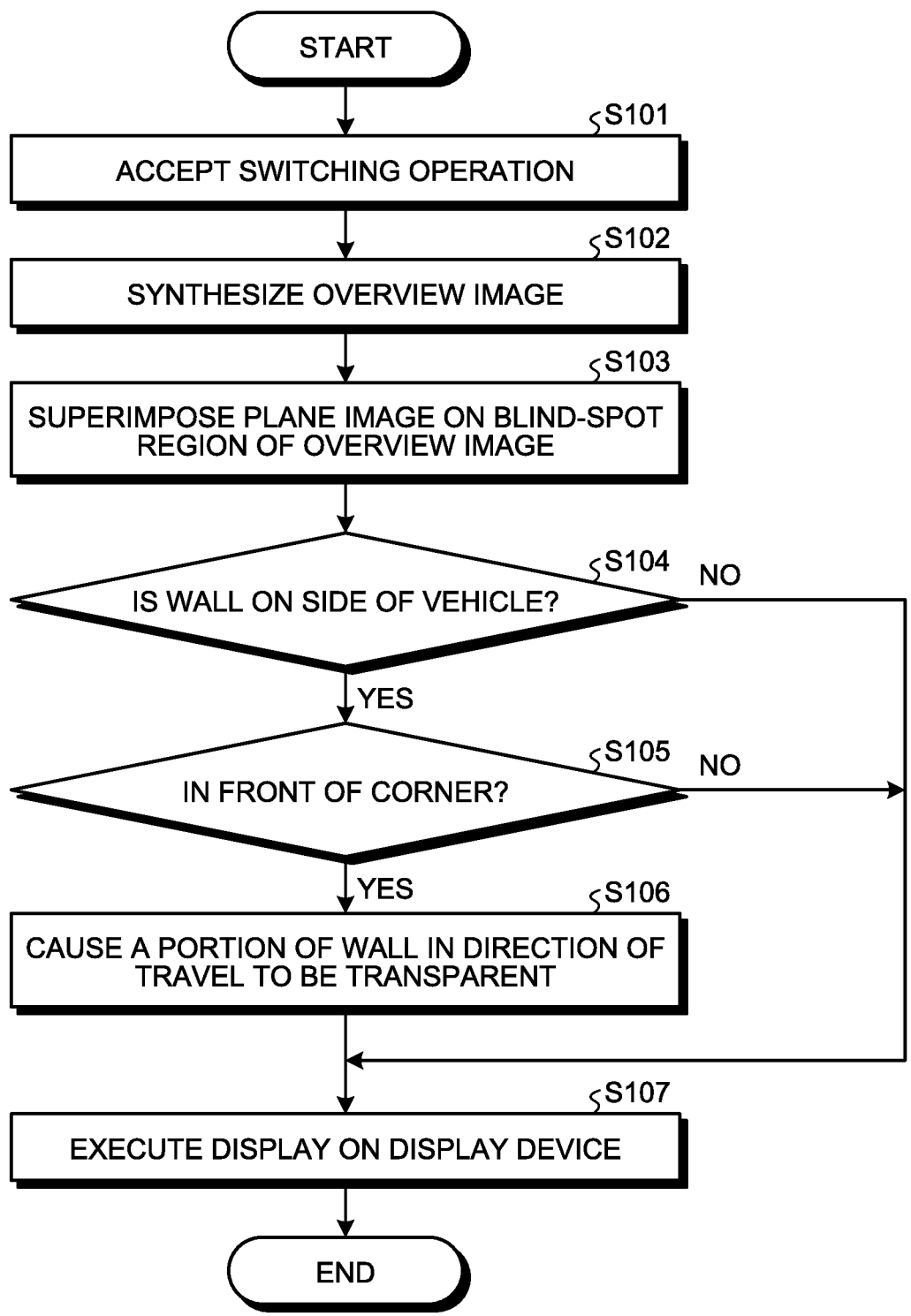

IMAGE GENERATION DEVICE AND IMAGE GENERATION METHOD

CROSS-REFERENCE TO RELATED APPLICATION

This application is based upon and claims the benefit of priority of the prior Japanese Patent Application No. 2016-255247, filed on Dec. 28, 2016 the entire contents of which are incorporated herein by reference.

FIELD

The embodiment discussed herein is directed to an image generation device and an image generation method.

BACKGROUND

Conventionally, there is an image generation device that synthesizes an overview image provided by overviewing an environment of a vehicle, based on a camera image of the vehicle. An image generation device superimposes an image that indicates a three-dimensional shape of a vehicle, at a position of a road surface where the vehicle exists thereon, on an overview image, so that the vehicle is displayed virtually (see, for example, Japanese Laid-open Patent Publication No. 2016-192772).

However, in a case where a vehicle is indicated by a three-dimensional shape thereof like a conventional technique, it may be difficult for a driver of the vehicle to recognize a vehicle width in an overview image, depending on a position of a virtual viewpoint.

SUMMARY

An image generation device according to an embodiment includes a synthesis unit and a superimposition unit. The synthesis unit synthesizes an overview image for a virtual viewpoint that is provided in a manner to look in a direction of travel of a vehicle so as to include at least a portion of a side of the vehicle based on a taken image that is taken by an image-taking unit that is provided on the vehicle. The superimposition unit superimposes a plane image where a vehicle has been caused to be planar, at a position of the vehicle on a road surface, on an overview image that is synthesized by the synthesis unit.

BRIEF DESCRIPTION OF DRAWINGS

A more complete appreciation of the disclosed technology and many of the attendant advantages thereof will be readily obtained as the same becomes better understood by reference to the following detailed description when considered in connection with the accompanying drawings, wherein:

FIG. 7 is a flowchart illustrating processing steps of a generation process that is executed by an image generation device according to an embodiment;

DESCRIPTION OF EMBODIMENT

Hereinafter, an embodiment of an image generation device and an image generation method as disclosed in the present application will be described in detail, with reference to the accompanying drawings. Additionally, the present invention is not limited by such an embodiment.

Figure 1A:
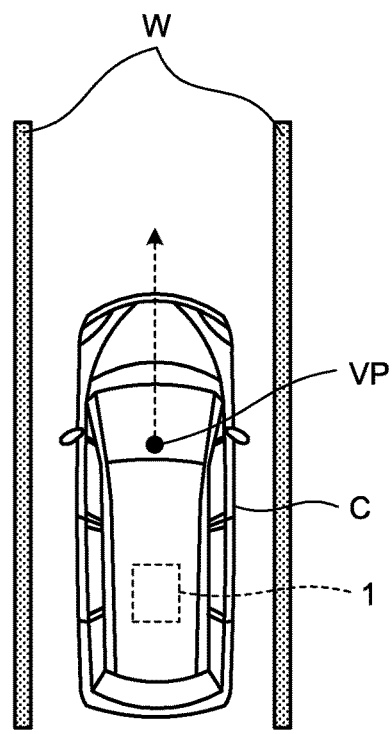
FIG. 1A is a diagram illustrating an outline of an image generation method according to an embodiment.
Figure 1B:
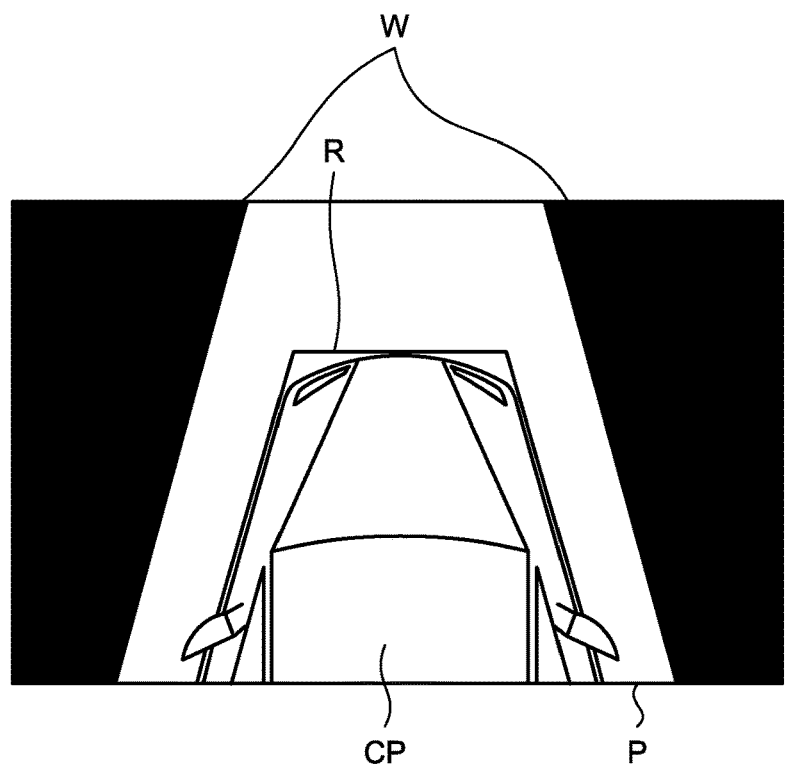
FIG. 1B is a diagram illustrating an outline of an image generation method according to an embodiment.

First, an outline of an image generation method according to an embodiment will be described by using FIG. 1A and FIG. 1B. FIG. 1A and FIG. 1B are diagrams illustrating an outline of an image generation method according to an embodiment. FIG. 1A illustrates a situation where a vehicle C is running on a narrow road that is interposed by walls W. A vehicle C is equipped with an image generation device 1 that executes an image generation method according to an embodiment.

Furthermore, FIG. 1B illustrates an overview image P that is viewed from a virtual viewpoint VP. A virtual viewpoint VP is a virtual point of view for an overview image P and includes information of a position of a point of view and a direction of a line of sight.

An overview image P is a synthetic image that is provided in a manner to look down from a virtual viewpoint VP and synthesized based on taken images that are taken by image-taking units 13a to 13d (see FIG. 3) that are provided on a vehicle C. For example, FIG. 1B illustrates an overview image P that is provided in a manner to look in a direction of travel of a vehicle C so as to include at least a portion of a side of the vehicle C. That is, an overview image P is a three-dimensional (3D) or stereoscopic image that is provided in a manner to look in a direction of travel of a vehicle C.

Herein, a conventional image generation method will be described. In a conventional image generation method, an image that indicates a three-dimensional shape of a vehicle is superimposed, at a position of a road surface where the vehicle exists thereon, in a synthesized overview image, so that it is possible for a driver to recognize a position of the vehicle.

However, in a case where a vehicle is conventionally indicated by a three-dimensional shape thereof, for example, in an overview image for a virtual viewpoint to view one side surface of a vehicle, it is difficult to recognize a position of an opposite side surface of the vehicle, and hence, it may be impossible to recognize a vehicle width in the overview image accurately.

Hence, in an image generation method according to an embodiment, a plane image CP where a vehicle C has been caused to be planar is superimposed, at a position of the vehicle C on a road surface, on an overview image P. That is, in an image generation method according to an embodiment, an image of a vehicle C is caused to be planar, and thereby, positions of both side surfaces of the vehicle C are always indicated by two lines independently of a position of a point of view for a virtual viewpoint VP. Additionally, a plane image CP is a two-dimensional (2D) image where a vehicle C has been caused to be planar.

Therefore, in an image generation method according to an embodiment, a driver of a vehicle C is facilitated to recognize positions of both side surfaces of the vehicle C, and hence, it is possible to recognize a vehicle width accurately. Furthermore, a plane image CP where a vehicle C has been caused to be planar is displayed, and hence, it is possible for a driver to recognize a position of the vehicle C in an overview image P intuitively and recognize a vehicle width.

Additionally, it is possible for the image generation device 1 according to an embodiment to set a virtual viewpoint VP inside a vehicle C, where such a matter will be described later by using FIG. 4A and FIG. 4B.

Furthermore, in the image generation device 1 according to an embodiment, a plane image CP is superimposed thereon, so as to be placed inside a blind-spot region R of the image-taking units 13a to 13d, where such a matter will be described later by using FIG. 5.

Figure 2:
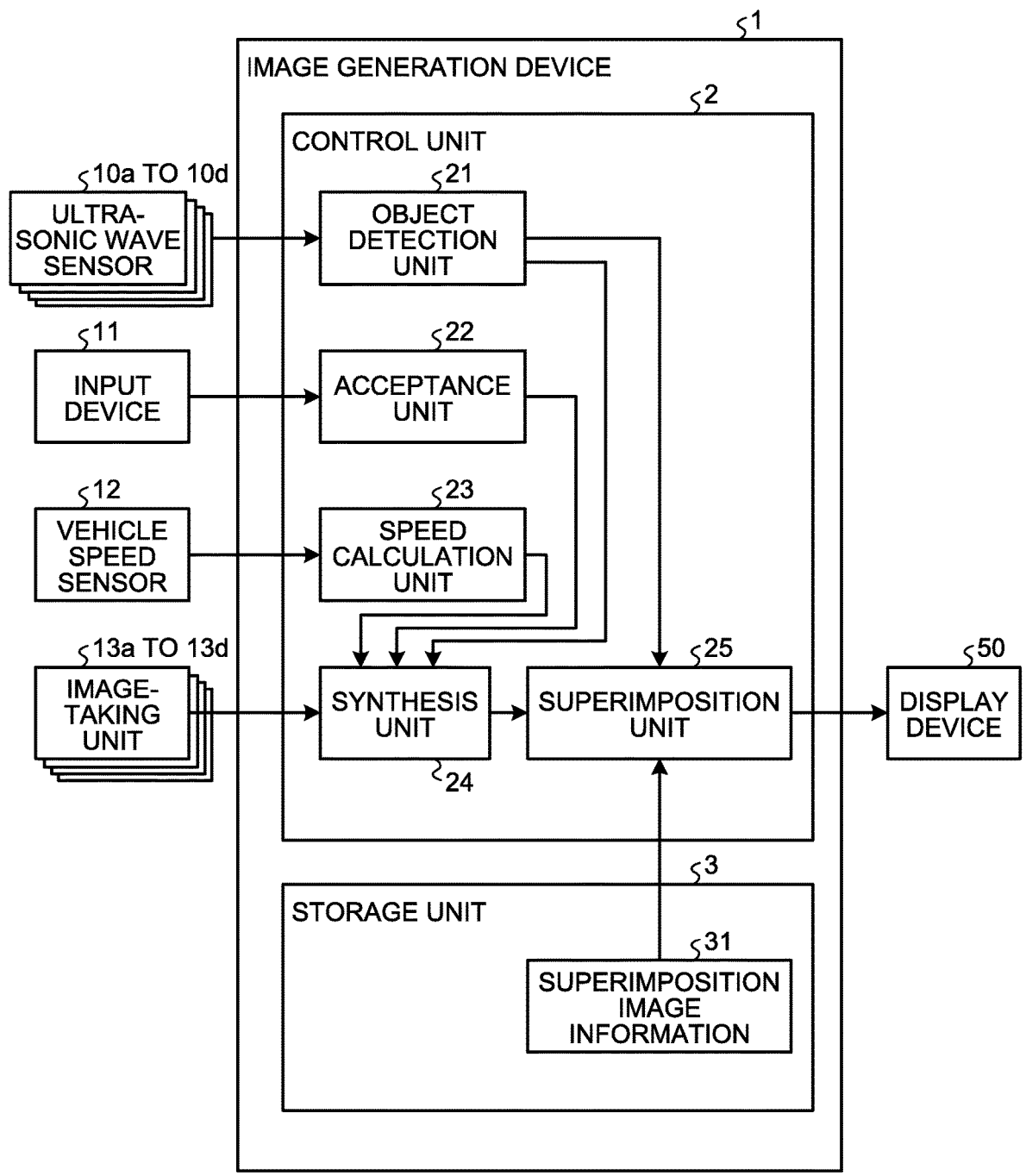
FIG. 2 is a block diagram illustrating a configuration of an image generation device according to an embodiment.

Next, a configuration of the image generation device 1 according to an embodiment will be described in detail with reference to FIG. 2. FIG. 2 is a block diagram illustrating a configuration of the image generation device 1 according to an embodiment. As illustrated in FIG. 2, the image generation device 1 according to an embodiment is connected to ultrasonic wave sensors 10a to 10d, an input device 11, a vehicle speed sensor 12, image-taking units 13a to 13d, and a display device 50. First, components other than the image generation device 1 will be described.

The ultrasonic wave sensors 10a to 10d receive reflection waves provided by reflecting transmitted transmission waves from an object and output a reception result to the image generation device 1. Additionally, an example of arrangement and detection ranges Sa to Sh of the ultrasonic wave sensors 10a to 10d will be described later by using FIG. 6A and FIG. 6B.

The input device 11 is, for example, an input device such as a touch panel display or a switching button, or is, for example, an input device for inputting a switching operation of a driver of a vehicle C to switch a position of a point of view for a virtual viewpoint VP. The vehicle speed sensor 12 generates a pulse signal that corresponds to the number of revolutions of an axle of a vehicle C and outputs such a pulse signal to the image generation device 1.

The image-taking units 13a to 13d are, for example, on-vehicle cameras with an image-taking element such as a Charge Coupled Device (CCD) or a Complementary Metal Oxide Semiconductor (CMOS). Furthermore, the image-taking units 13a to 13d include wide-angle lenses such as fish-eye lenses and are capable of widely taking an image of an environment of a vehicle C.

Figure 3:
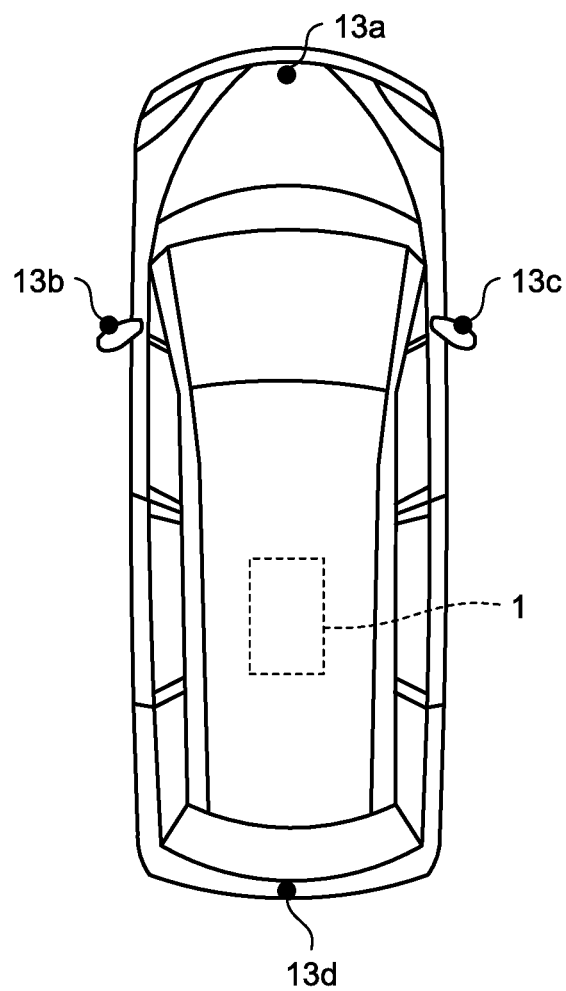
FIG. 3 is a diagram illustrating an example of arrangement of an image-taking unit.

Herein, an example of arrangement of the image-taking units 13a to 13d on a vehicle C will be described by using FIG. 3. FIG. 3 is a diagram illustrating an example of arrangement of the image-taking units 13a to 13d. The multiple image-taking units 13a to 13d are arranged on a front, a back, a right, and a left of a vehicle C, respectively.

The image-taking unit 13a takes an image of a front of a vehicle C, the image-taking unit 13b takes an image of a left side of the vehicle C, the image-taking unit 13c takes an image of a right side of the vehicle C, and the image-taking unit 13d takes an image of a back of the vehicle C. Thereby, it is possible to take an image of a situation of a vehicle C in any direction.

Additionally, in an example of arrangement as illustrated in FIG. 3, a region directly below a vehicle C that corresponds to a position of the vehicle C on a road surface (namely, a region where it is possible to produce shadow between the vehicle C and the road surface) is a blind-spot region R of the image-taking units 13a to 13d, where such a matter will be described later by using FIG. 5.

By returning to FIG. 2, the display device 50 will be described. The display device 50 is, for example, a navigation device with a liquid crystal panel and displays information that is output from the image generation device 1. Additionally, the display device 50 and the input device 11 are configured separately, and may be integrally configured to be, for example, one electronic device that has functions of the display device 50 and the input device 11.

Next, the image generation device 1 according to an embodiment will be described. The image generation device 1 according to an embodiment includes a control unit 2 and a storage unit 3. The control unit 2 includes an object detection unit 21, an acceptance unit 22, a speed calculation unit 23, a synthesis unit 24, and a superimposition unit 25. The storage unit 3 stores superimposition image information 31.

Herein, the image generation device 1 includes, for example, a computer that has a Central Processing Unit (CPU), a Read Only Memory (ROM), a Random Access Memory (RAM), a Hard Disk Drive (HDD), an input/output port, and the like, and a variety of circuits.

A CPU of a computer reads and executes a program stored in a ROM and thereby functions as the object detection unit 21, the acceptance unit 22, the speed calculation unit 23, the synthesis unit 24, and the superimposition unit 25 of the control unit 2.

Furthermore, it is also possible for hardware such as an Application Specific Integrated Circuit (ASIC) or a Field Programmable Gate Array (FPGA) to compose at least one or all of the object detection unit 21, the acceptance unit 22, the speed calculation unit 23, the synthesis unit 24, and the superimposition unit 25 of the control unit 2.

Furthermore, the storage unit 3 corresponds to, for example, a RAM or an HDD. It is possible for a RAM or an HDD to store the superimposition image information 31, information of a variety of programs, and the like. Additionally, the image generation device 1 may acquire a program as described above or a variety of information through another computer or a portable recording medium that is connected thereto by a wired or wireless network.

The control unit 2 synthesizes an overview image P based on a taken image, superimposes a plane image CP where a vehicle C has been caused to be planar, at a position of the vehicle C on a road surface, on the synthesized overview image P, and displays it on the display device 50.

The object detection unit 21 detects an object that exists in an environment of a vehicle C. Specifically, the object detection unit 21 detects an object based on a result of reception of reflection waves that are output from the ultrasonic wave sensors 10a to 10d (namely, clearance sonars).

The object detection unit 21 outputs a detected object to the synthesis unit 24 and the superimposition unit 25. Additionally, the object detection unit 21 is not limited to a clearance sonar but may detect an object due to, for example, a radar device that uses millimeter waves or the like. Alternatively, the object detection unit 21 may detect an object based on taken images of the image-taking units 13a to 13d.

The acceptance unit 22 accepts, for example, a switching operation for a virtual viewpoint VP that is applied to the input device 11 by a driver of a vehicle C. Such a switching operation is an operation that determines parameters for a position of a point of view and a direction of a line of sight for a virtual viewpoint VP. The acceptance unit 22 outputs information of such an accepted switching operation to the synthesis unit 24.

It is possible to represent a position of a point of view by, for example, coordinates of such a position in a three-dimensional space. Furthermore, it is possible to represent a direction of a line of sight for a virtual viewpoint VP as an angle α and an angle β (see FIG. 4A and FIG. 4B).

The speed calculation unit 23 calculates a running speed of a vehicle C based on a pulse signal from the vehicle speed sensor 12. Additionally, the speed calculation unit 23 is not limited to that from the vehicle speed sensor 12 but may calculate a running speed of a vehicle C based on, for example, a taken image from an image-taking unit 10.

The synthesis unit 24 synthesizes an overview image P that is provided in a manner to look in a predetermined direction of a line of sight from a position of a point of view for a virtual viewpoint VP, based on taken images that are taken by the image-taking units 13a to 13d. Specifically, the synthesis unit 24 projects (or maps) a taken image on a predetermined projection plane and provides, as an overview image P, an image of a region that is included within a predetermined viewing angle when viewed from an arbitrary virtual viewpoint VP, among input images that have been projected onto the predetermined projection plane.

For example, the synthesis unit 24 stores a table that indicates a correspondence relationship between positions of data that are included in a taken image and a position of a predetermined projection plane, and it is possible to project the data that are included in a taken image at corresponding positions on the predetermined projection plane by using such a table.

Such a predetermined projection plane is, for example, of a substantially hemispherical shape (for example, a bowl shape), where its central region (for example, a bottom portion of a bowl) is provided at a position of a vehicle C and an outside of a position of the vehicle C (for example, a portion other than a bottom portion of a bowl) corresponds to a region of an environment of the vehicle C. A predetermined projection plane does not have to be a curve but may be a plane.

For example, the synthesis unit 24 synthesizes an overview image P for a virtual viewpoint VP that is provided in a manner to look in a direction of travel of a vehicle C so as to include at least a portion of a side of the vehicle C. Such a matter will be described by using FIG. 4A and FIG. 4B.

Figure 4A:
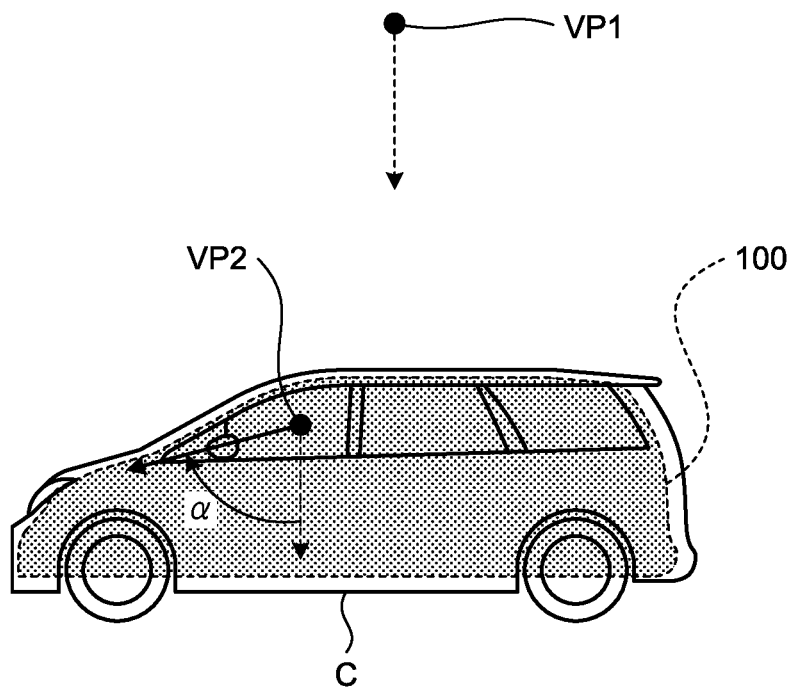
FIG. 4A is a diagram illustrating a content of processing of a synthesis unit.
Figure 4B:
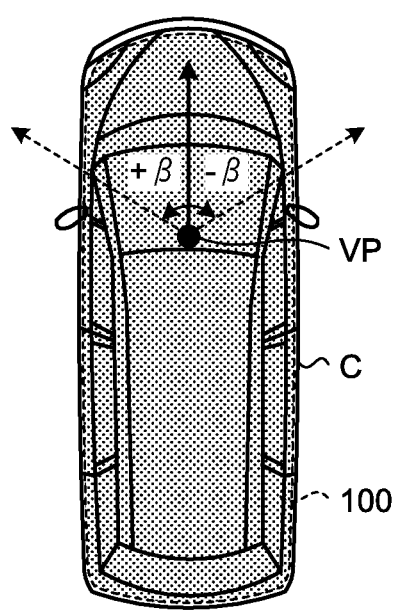
FIG. 4B is a diagram illustrating a content of processing of a synthesis unit.

FIG. 4A and FIG. 4B are diagrams illustrating a content of processing of the synthesis unit 24. FIG. 4A illustrates a virtual viewpoint VP1 that is an initial position, a virtual viewpoint VP2 after switching of a point of view, and a settable range 100 of the virtual viewpoint VP2. Furthermore, a direction of a line of sight for a virtual viewpoint VP1 is a vertical direction.

Herein, an overview image P in a case of looking in a vertical direction from a virtual viewpoint VP1 is first displayed, and subsequently, a driver of a vehicle C specifies one point in the settable range 100 on the input device 11, so that a position of a point of view for a virtual viewpoint VP is switched.

As illustrated in FIG. 4A, the settable range 100 is set at a position that is nearer a road surface than a virtual viewpoint VP1 that is an initial position. Furthermore, the settable range 100 is a range that is composed of a height, a total length, and a width of a vehicle C in a three-dimensional space (FIG. 4B).

That is, the synthesis unit 24 produces an overview image P where a virtual viewpoint VP2 is provided in an inside of a vehicle C. Thereby, an overview image P for a virtual viewpoint VP2 is enlarged and displayed (zoomed and displayed) as compared with an overview image P for a virtual viewpoint VP1, and hence, it is possible for a driver of a vehicle C to readily recognize a clearance between the vehicle C and an obstacle such as a wall W.

Additionally, it is preferable for a position of a point of view for a virtual viewpoint VP2 to be near a position of a point of view of a driver of a vehicle C in the settable range 100. Thereby, it is possible to display an overview image P that is similar to a scene that is practically viewed by a driver of a vehicle C, and hence, it is possible for the driver to accept the overview image P without a feeling of strangeness.

Then, the synthesis unit 24 sets a direction of a line of sight for a virtual viewpoint VP2 based on an angle α and an angle β that are accepted by the acceptance unit 22. Specifically, the synthesis unit 24 first rotates it in a direction of travel of a vehicle C by an angle α with respect to a vertical direction at a virtual viewpoint VP2 (that corresponds to a direction of a line of sight for a virtual viewpoint VP1) to set a direction of a line of sight for the virtual viewpoint VP2.

In other words, the synthesis unit 24 sets a direction of a line of sight for a virtual viewpoint VP2 so as to look in a direction of travel of a vehicle C from an opposite side of the direction of travel thereof. Thereby, for example, in a case where an obstacle or the like exists in a direction of travel of a vehicle C, it is possible to recognize such an obstacle from an overview image P.

Then, as illustrated in FIG. 4B, the synthesis unit 24 sets a direction of a line of sight in a direction of a vehicle width. Specifically, the synthesis unit 24 rotates it by an angle β (a positive or negative value) with respect to a direction parallel to a direction of travel of a vehicle C.

An angle β is settable within a range that is greater than or equal to 0 degrees and less than or equal to 90 degrees (0≤β≤90). In a case where an angle β is zero degrees, it is possible to have visual contact with portions of both sides of a vehicle C in an overview image P. Furthermore, in a case where an angle β is, for example, +90 degrees, it is possible to have visual contact with portions of a left side of a vehicle C and a left side with respect to a direction of travel thereof in an overview image P.

Thereby, an overview image P is synthesized in such a manner that a side of a vehicle C where an obstacle such as a wall W exists thereon is indicated intensively, and hence, it is possible to readily recognize a clearance between the vehicle C and the wall W.

Additionally, the synthesis unit 24 sets an angle α due to a manual operation of a driver, but may preliminarily store and automatically set an optimum angle α dependent on a position of a virtual viewpoint VP2. Furthermore, the synthesis unit 24 may set an angle α depending on a running speed of a vehicle C.

Specifically, the synthesis unit 24 increases an angle α with increasing a running speed of a vehicle C. This is because a driver of a vehicle C has to look into a farther distance in a direction of travel thereof as a running speed thereof is increased.

Thereby, it is possible for a driver of a vehicle C to quickly recognize, for example, an obstacle that exists in a direction of travel thereof from an overview image P, and hence, it is possible to deal with such an obstacle in good time.

Furthermore, the synthesis unit 24 may automatically set an angle β depending on a turning angle of a vehicle C. Specifically, the synthesis unit 24 tilts a direction of a line of sight toward a turning side, and rotates such a direction of a line of sight while an angle β is, for example, a turning angle that is detected from a steering angle sensor or the like.

Thereby, as a vehicle C, for example, turns a corner of a narrow road, it is possible to reduce a situation such as involution of a bicycle or the like or scraping of a side surface of the vehicle C against a wall W, and hence, it is possible to further improve safety of the vehicle C.

Additionally, the settable range 100 for a virtual viewpoint VP2 is an inside of a vehicle C in FIG. 4A, and the settable range 100 may be an outside of the vehicle C as long as it is at a position nearer a road surface than a virtual viewpoint VP1.

By returning to FIG. 2, a description of the control unit 2 will be continued. The superimposition unit 25 of the control unit 2 superimposes a plane image CP where a vehicle C has been caused to be planar, at a position of the vehicle C on a road surface, on an overview image P that is synthesized by the synthesis unit 24.

Specifically, the superimposition unit 25 generates a plane image CP based on the superimposition image information 31 that is stored in the storage unit 3. The superimposition image information 31 is information that includes a plane image CP that is provided in a manner to view a vehicle C from any vertical viewpoint at a position of a point of view and in a direction of a line of sight. A plane image CP in the superimposition image information 31 is capable of being preliminarily generated by, for example, chroma key synthesis.

That is, the superimposition unit 25 selects, from the superimposition image information 31, a plane image CP that corresponds to a position of a point of view and a direction of a line of sight for a virtual viewpoint VP2 that are set by the synthesis unit 24.

Additionally, the superimposition unit 25 selects a plane image CP from the superimposition image information 31 and is not limited thereto, and the superimposition unit 25 may generate such a plane image CP based on a position of a point of view and a direction of a line of sight for a virtual viewpoint VP2 as needed.

Then, the superimposition unit 25 superimposes a plane image CP on an overview image P so as to be placed inside a blind-spot region R of the image-taking units 13a to 13d. Such a matter will be described by using FIG. 5.

Figure 5:
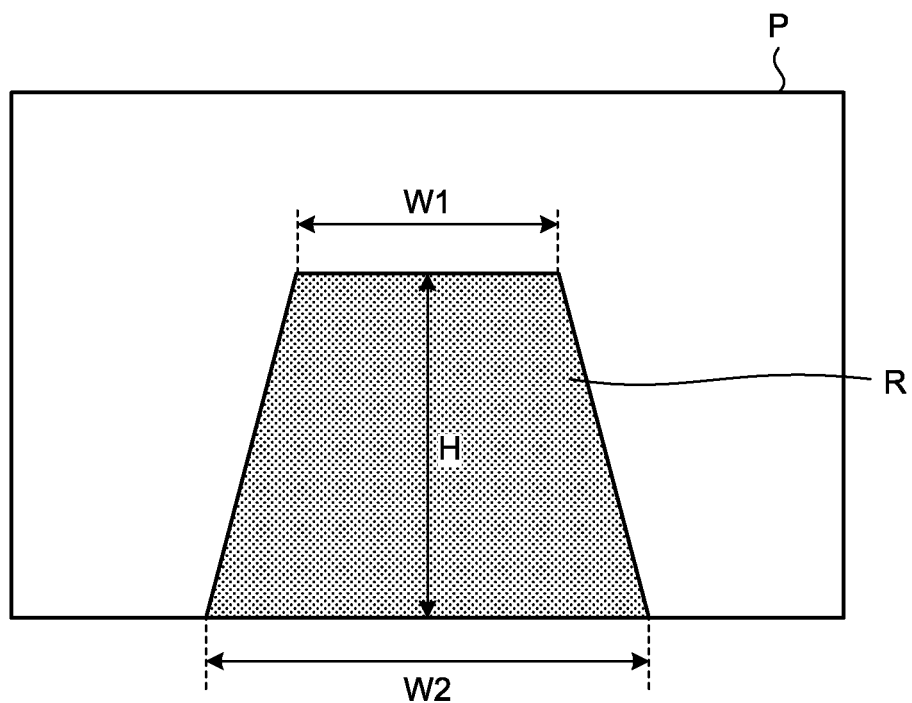
FIG. 5 is a diagram illustrating a blind-spot region of an image-taking unit in an overview image.

FIG. 5 is a diagram illustrating a blind-spot region R of the image-taking units 13a to 13d in an overview image P. A blind-spot region R is a region that is not included in taken images of the image-taking units 13a to 13d. In a case of arrangement of the image-taking units 13a to 13d (see FIG. 3), a blind-spot region R is provided directly below a vehicle C (namely, a region where shadow is produced, between the vehicle C and a road surface).

That is, a blind-spot region R is substantially identical to a total length and a width of a vehicle C. Furthermore, as illustrated in FIG. 5, a blind-spot region R in an overview image P is of a trapezoidal shape that is composed of an upper base W1, a lower base W2, and a height H. An upper base W1, a lower base W2, and a height H are set depending on a position of a point of view and a direction of a line of sight for a virtual viewpoint VP2.

Specifically, in a case where a direction of a line of sight for a virtual viewpoint VP2 is assumed to be constant, an upper base W1, a lower base W2, and a height H of a blind-spot region R decrease with increasing a height of a position of a point of view. Furthermore, a height H decreases as a position of a point of view transfers in a direction of travel. Furthermore, in a case where a position of a point of view for a virtual viewpoint VP2 is assumed to be constant, a height H and a length of an upper base W1 decrease with increasing an angle α of a direction of a line of sight.

That is, the superimposition unit 25 deforms a plane image CP so as to have a shape that is substantially identical to a shape of a blind-spot region R based on a virtual viewpoint VP2. Thereby, it is possible to visually recognize a vehicle C due to a plane image CP, and hence, it is possible to readily recognize a clearance between the vehicle C and an obstacle such as a wall W.

Additionally, the superimposition unit 25 may superimpose, on an overview image P, a detection range image that indicates a detection range S of the object detection unit 21. Such a matter will be described by using FIG. 6A and FIG. 6B.

Figure 6A:
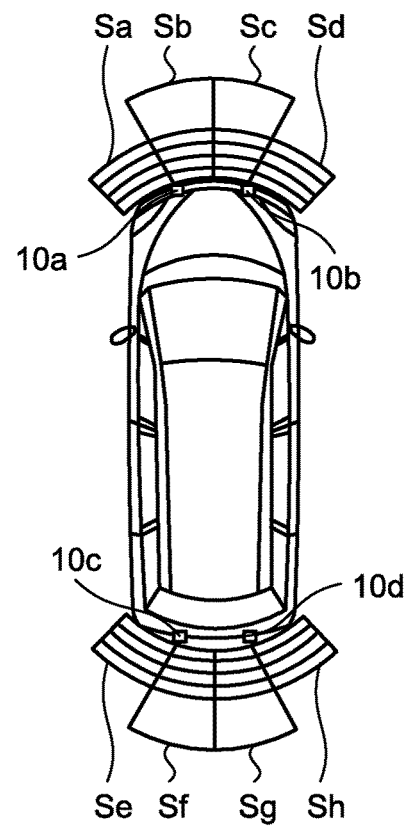
FIG. 6A is a diagram illustrating a detection range of an object detection unit.
Figure 6B:
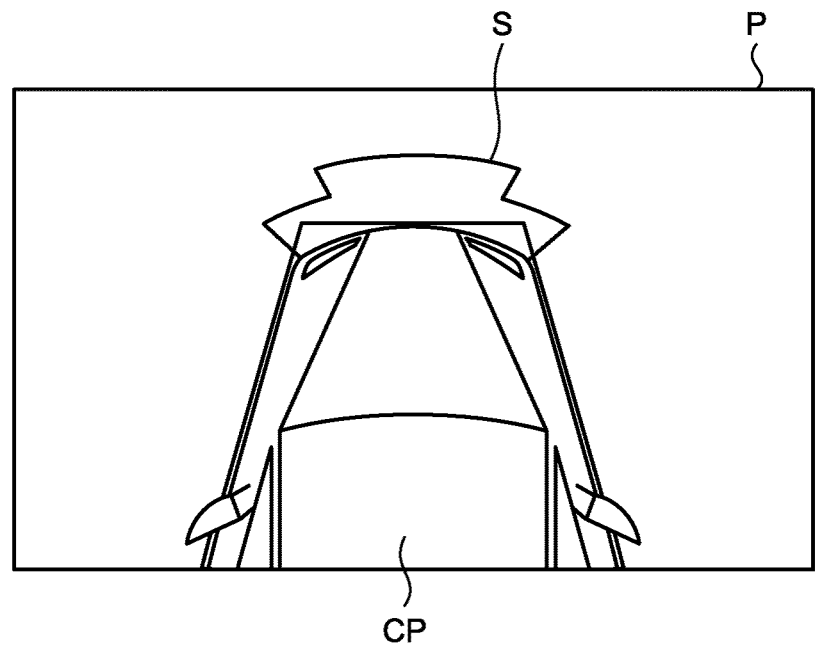
FIG. 6B is a diagram illustrating a detection range of an object detection unit.

FIG. 6A and FIG. 6B are diagrams illustrating detection ranges Sa to Sh of the ultrasonic wave sensors 10a to 10d that are connected to the object detection unit 21. FIG. 6A illustrates detection ranges Sa to Sh of the ultrasonic wave sensors 10a to 10d in a case where a vehicle C is looked down at in a vertical direction, and FIG. 6B illustrates an outer perimeter of detection ranges Sa to Sd as a detection range S.

As illustrated in FIG. 6A, for example, the ultrasonic wave sensors 10a, 10b are provided on a front side of a vehicle C (for example, a back of a bumper), where the ultrasonic wave sensor 10a has detection ranges Sa, Sb and the ultrasonic wave sensor 10b has detection ranges Sc, Sd.

Furthermore, for example, the ultrasonic wave sensors 10c, 10d are provided on a rear side of a vehicle C (for example, a back of a bumper), where the ultrasonic wave sensor 10c has detection ranges Se, Sf and the ultrasonic wave sensor 10d has detection ranges Sg, Sh.

Furthermore, each of detection ranges Sa to Sh is divided into multiple (four in FIG. 6A) regions at an interval of a predetermined distance and the object detection unit 21 is informed of a region that corresponds to a position of a detected object, as a detection position. Moreover, detection ranges Sb, Sc, Sf, Sg are provided with additional regions outside such divided regions. This is provided to quickly catch an object that exists in a direction of travel.

For example, as illustrated in FIG. 6B, the superimposition unit 25 generates a detection range image of a detection range S where detection ranges Sa to Sh are deformed based on a position of a point of view and a direction of a line of sight for a virtual viewpoint VP2. Specifically, the superimposition unit 25 executes deformation so as to fit a nose shape (for example, a bumper shape) of a vehicle C.

That is, the superimposition unit 25 superimposes, on an overview image P, a detection range S deformed in such a manner that detection ranges Sa to Sh are equidistant from a tip of a vehicle C, so that it is possible to make it difficult to cause a feeling of strangeness against a detection range S and it is possible for a driver of the vehicle C to accurately recognize existence of an obstacle such as a wall W and a distance to the obstacle.

Next, processing steps of a generation process that is executed by the image generation device 1 according to an embodiment will be described by using FIG. 7. FIG. 7 is a flowchart illustrating processing steps of a generation process that is executed by the image generation device 1 according to an embodiment.

As illustrated in FIG. 7, first, the acceptance unit 22 accepts an operation to switch a point of view for an overview image P that is executed by a passenger of a vehicle C (step S101). Then, the synthesis unit 24 synthesizes an overview image P for a virtual viewpoint VP that is provided in a manner to look in a direction of travel of a vehicle C so as to include at least a portion of a side of the vehicle C based on taken images that are taken by the image-taking units 13a to 13d that are provided on the vehicle C (step S102).

Then, the superimposition unit 25 superimposes a plane image CP where a vehicle C has been caused to be planar, on a blind-spot region R that is provided at a position of the vehicle C on a road surface in an overview image P that is synthesized by the synthesis unit 24 (step S103). Then, the synthesis unit 24 determines whether or not an object such as a wall W exists on a side of a vehicle C (step S104). Additionally, presence or absence of an obstacle is detectable by, for example, the object detection unit 21.

In a case where it is determined that an obstacle such as a wall W exists on a side of a vehicle C (step S104, Yes), the synthesis unit 24 determines whether or not a position of the vehicle C is in front of a corner of a T-junction or the like (step S105). Additionally, a specific processing content at or after step S105 will be described later by using FIG. 8A and FIG. 8B.

In a case where a vehicle C is provided in front of a corner (step S105, Yes), the synthesis unit 24 synthesizes an overview image P where a portion of a region where a wall W (an obstacle) exists therein in the overview image P in a direction of travel is caused to be transparent (step S106).

Then, the superimposition unit 25 outputs a synthetic image where a plane image CP is superimposed on an overview image P, to the display device 50 to display it thereon (step S107) and ends such a process.

On the other hand, at step S104, in a case where it is determined that an obstacle such as a wall W does not exist on a side of a vehicle C (step S104, No), the synthesis unit 24 transfers such a process to step S107.

Furthermore, at step S105, in a case where it is determined that a position of a vehicle C is not in front of a corner (step S105, No), the synthesis unit 24 transfers such a process to step S107.

As has been described above, the image generation device 1 according to an embodiment includes the synthesis unit 24 and the superimposition unit 25. The synthesis unit 24 synthesis an overview image P for a virtual viewpoint VP that is provided in a manner to look in a direction of travel of a vehicle C so as to include at least a portion of a side of the vehicle C, based on taken images that are taken by the image-taking units 13a to 13d that are provided on the vehicle C. The superimposition unit 25 superimposes a plane image CP where a vehicle C has been caused to be planar, at a position of the vehicle C on a road surface, on an overview image P that is synthesized by the synthesis unit 24. Thereby, it is possible to readily recognize a positional relationship between an obstacle such as a wall W and a vehicle C. That is, a plane image CP where a vehicle C has been caused to be planar is synthesized into a stereoscopic overview image P, so that it is possible to readily recognize, in particular, an environment of the vehicle C, in the overview image P, as compared with a case where the vehicle C is displayed as a stereoscopic image.

In the embodiment as described above, the synthesis unit 24 synthesizes an overview image P in a range that is practically visible for a driver of a vehicle C, and may synthesize, for example, an overview image P where a portion of the overview image P in a direction of travel is caused to be transparent, so that a range that is practically invisible for a driver of the vehicle C is caused to be visible. Such a matter will be described by using FIG. 8A and FIG. 8B.

Figure 8A:
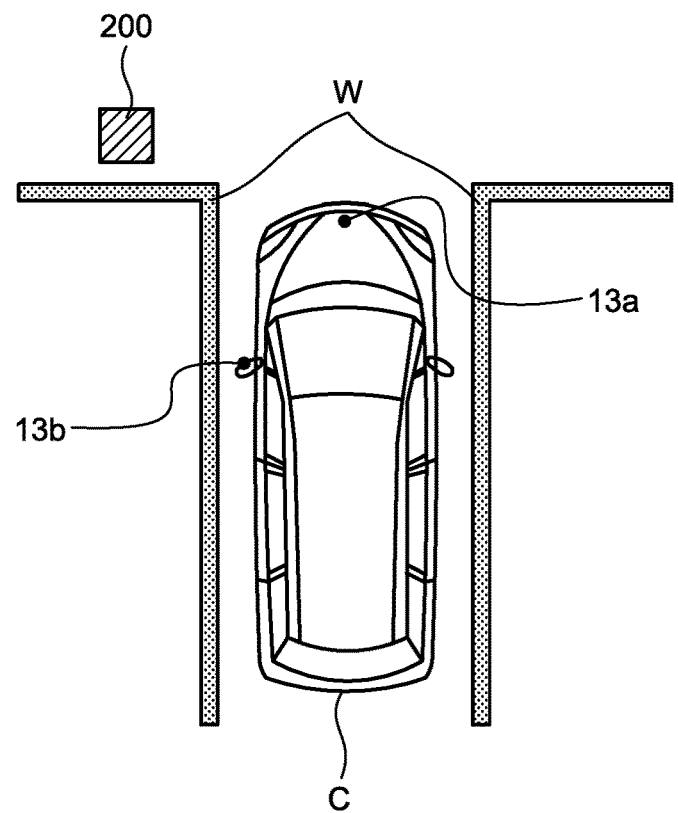
FIG. 8A is a diagram illustrating transparency processing of a synthesis unit according to a variation thereof.
Figure 8B:
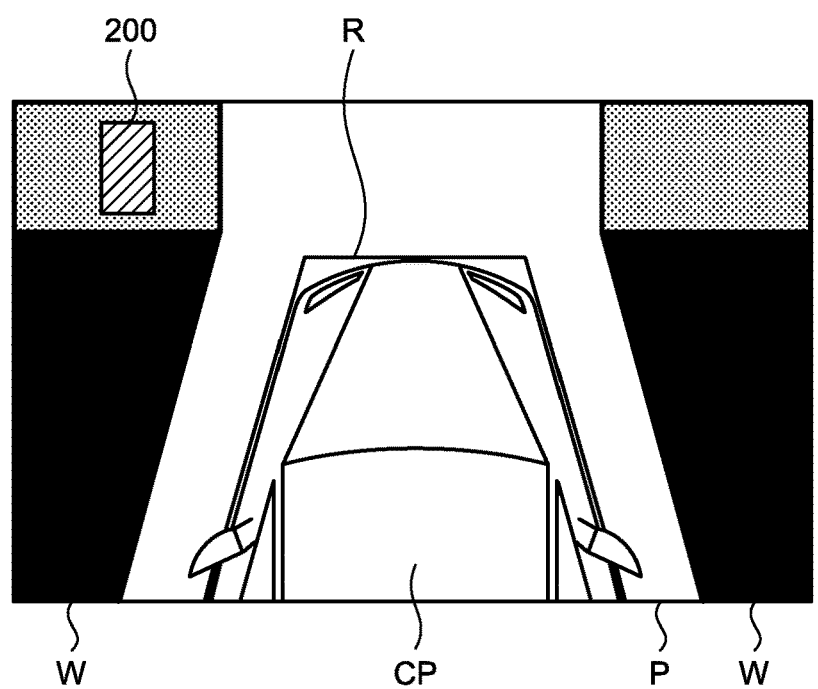
FIG. 8B is a diagram illustrating transparency processing of a synthesis unit according to a variation thereof.

FIG. 8A and FIG. 8B are diagrams illustrating a content of processing of the synthesis unit 24 according to a variation. FIG. 8A illustrates a situation where a vehicle C runs on a near side of a corner of a narrow road and an object 200 exists ahead of the corner. Additionally, it is assumed that it is impossible for a driver of a vehicle C to have visual contact with the object 200.

In such a case, a taken image of the image-taking unit 13a includes the object 200 and a taken image of the image-taking unit 13b does not include the object 200. Usually, in the synthesis unit 24, as a virtual viewpoint VP is provided in an inside of a vehicle C, an overview image P includes a wall W and does not include the object 200.

Hence, in the synthesis unit 24 according to a variation, a portion of a wall W is caused to be transparent, so that it is possible for a driver to have visual contact with the object 200 that is present on a back side of the wall W. Specifically, as illustrated in FIG. 8B, the synthesis unit 24 synthesizes an overview image P where a portion of a wall W that is an obstacle has been caused to be transparent, so that the overview image P includes the object 200.

For example, in a case where a wall W that is an obstacle exists on a side of a vehicle C, the synthesis unit 24 synthesizes an overview image P where a portion of a region where such an obstacle exists therein in the overview image P in a direction of travel has been caused to be transparent. More specifically, in a case where taken images of the image-taking units 13a to 13d are mapped on a projection surface, the synthesis unit 24 causes a region where the object 200 and a wall W overlap when viewing from a virtual viewpoint VP to be transparent.

For example, the synthesis unit 24 increases a transparency of a region of a wall W that is included in a taken image of the image-taking unit 13b. Thereby, for an overview image P as illustrated in FIG. 8B, it is possible to cause a wall W that is an obstacle to be transparent, and to include the object 200. Therefore, it is possible for a driver of a vehicle C to recognize a clearance between a wall W and a vehicle C and quickly catch the object 200 that exists on a back side of the wall W.

Additionally, although the synthesis unit 24 in FIG. 8A and FIG. 8B causes a partial region of an overview image P to be transparent in a case where a corner exists in front of a vehicle C and is not limited to a situation of the corner, as long as such a situation has a need to have visual contact with a back side of an obstacle such as a wall W.

Furthermore, the synthesis unit 24 in the embodiment as described above synthesizes an overview image P, for example, in a case where the acceptance unit 22 manually accepts an operation to switch a virtual viewpoint VP from a driver of a vehicle C, and may switch the virtual viewpoint VP automatically.

For example, the synthesis unit 24 may identify a road width based on taken images of the image-taking units 13a to 13d, and synthesize an overview image P for a virtual viewpoint VP in a case where such an identified road width is reduced to a predetermined distance or less. Thereby, a driver of a vehicle C does not have to execute a switching operation, and hence, it is possible to concentrate on driving on a narrow road.

Furthermore, the superimposition unit 25 in an embodiment as described above superimposes a plane image CP where a vehicle C has been caused to be planar, at a position of the vehicle C on a road surface, on an overview image P that is synthesized by the synthesis unit 24. However, the superimposition unit 25 may superimpose a plane image CP where a vehicle C has been caused to be stereoscopic, at a position of the vehicle C on a road surface, on an overview image P that is synthesized by the synthesis unit 24, and superimpose a planar plane image CP instead of such a stereoscopic plane image CP thereon in a case where the vehicle C is at a predetermined running position or in a predetermined running state.

That is, in a case where a vehicle C is at a predetermined running position or in a predetermined running state, a planar plane image CP instead of a stereoscopic plane image CP may be superimposed thereon. That is, in a case where a vehicle C is positioned at or approaches a corner of a narrow road, the superimposition unit 25 may superimpose a planar plane image CP instead of a stereoscopic plane image CP on an overview image P.

Furthermore, in a case where a speed of a vehicle C is reduced to a predetermined low speed, the superimposition unit 25 may superimpose a planar plane image CP instead of a stereoscopic plane image CP on an overview image P.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image generation device for use with a vehicle having a camera, the image generation device comprising:
    a processor or integrated circuit configured to:
        receive a taken image that is taken by the camera that is provided on the vehicle;
        detect an object that is located behind a wall that is in front of the vehicle or parallel to the vehicle based on the taken image;
        synthesize an overview image for a virtual viewpoint that is provided in an inside of the vehicle that looks in a direction of a travel of the vehicle so as to include: (i) at least a portion of a side of the vehicle, and (ii) the object that is located behind the wall by making the wall transparent in the synthesized overview image, based on the taken image; and
        superimpose a plane image that indicates a two-dimensional shape of the vehicle and an appearance of the vehicle where the vehicle has been caused to be planar, at a position of the vehicle on a road surface, on the synthesized overview image.

2. The image generation device according to claim 1, wherein the processor or the integrated circuit superimposes the plane image thereon so as to be placed inside a blind-spot region of the camera in the overview image.

3. The image generation device according to claim 1, wherein the processor or integrated circuit is further programmed to:
    detect an object that exists in an environment of the vehicle, wherein
    the processor or the integrated circuit superimposes a detection range image that indicates a detection range on the overview image.

4. The image generation device according to claim 2, wherein the processor or integrated circuit is further programmed to:
    detect an object that exists in an environment of the vehicle, wherein
    the processor or the integrated circuit superimposes a detection range image that indicates a detection range on the overview image.

5. The image generation device according to claim 2, wherein the processor or the integrated circuit synthesizes, in a case where an obstacle exists on a side of the vehicle, the overview image where a portion of a region where the obstacle exists therein in the overview image in the direction of travel has been caused to be transparent.

6. The image generation device according to claim 3, wherein the processor or the integrated circuit synthesizes, in a case where an obstacle exists on a side of the vehicle, the overview image where a portion of a region where the obstacle exists therein in the overview image in the direction of travel has been caused to be transparent.

7. The image generation device according to claim 4, wherein the processor or the integrated circuit synthesizes, in a case where an obstacle exists on a side of the vehicle, the overview image where a portion of a region where the obstacle exists therein in the overview image in the direction of travel has been caused to be transparent.

8. An image generation method for use with a vehicle having a camera, the image generation method comprising:
    receiving a taken image that is taken by the camera that is provided on the vehicle;
    detecting an object that is located behind a wall that is in front of the vehicle or parallel to the vehicle based on the taken image;
    synthesizing an overview image for a virtual viewpoint that is provided in an inside of the vehicle that looks in a direction of a travel of the vehicle so as to include: (i) at least a portion of a side of the vehicle, and (ii) the object that is located behind the wall by making the wall transparent in the synthesized overview image, based on the taken image; and
    superimposing a plane image that indicates a two-dimensional shape of the vehicle and an appearance of the vehicle where the vehicle has been caused to be planar, at a position of the vehicle on a road surface, on the synthesized overview image.

* * * * *